(12) United States Patent
Lu et al.

(10) Patent No.: US 11,263,507 B2
(45) Date of Patent: Mar. 1, 2022

(54) IC CARD WITH FINGERPRINT RECOGNITION FUNCTION AND WORKING METHOD THEREOF

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 17/040,758

(22) PCT Filed: May 28, 2019

(86) PCT No.: PCT/CN2019/088706
§ 371 (c)(1),
(2) Date: Sep. 23, 2020

(87) PCT Pub. No.: WO2019/237913
PCT Pub. Date: Dec. 19, 2019

(65) Prior Publication Data
US 2021/0357718 A1 Nov. 18, 2021

(30) Foreign Application Priority Data
Jun. 12, 2018 (CN) .......................... 201810600365.6

(51) Int. Cl.
*G06K 19/07* (2006.01)
*G06K 7/00* (2006.01)
*G06K 19/073* (2006.01)

(52) U.S. Cl.
CPC ... *G06K 19/07354* (2013.01); *G06K 19/0718* (2013.01)

(58) Field of Classification Search
CPC ........ G06K 7/08; G06K 19/00; G06Q 20/206; G06Q 20/34; G06Q 20/341
(Continued)

(56) References Cited

U.S. PATENT DOCUMENTS

| 2016/0314469 A1 | 10/2016 | Lu et al. | |
| 2018/0129831 A1* | 5/2018 | Yokoi | ............... H01L 29/78696 |
| 2018/0189527 A1* | 7/2018 | Kim | ................... G06K 7/10316 |

* cited by examiner

*Primary Examiner* — Edwyn Labaze
(74) *Attorney, Agent, or Firm* — Hammer & Associates, P.C.

(57) ABSTRACT

A working method for an IC card having a fingerprint recognition function, comprising: an IC card receiving and determining an instruction type from a terminal, and when determined that the received instruction is an application selection instruction, the IC card selecting an application and returning a response to the terminal; when determined that the received instruction is a processing option acquisition instruction, the IC card acquiring a user fingerprint information verification state according to the content of the instruction, and if verification is successful, returning to the terminal a processing option instruction response containing an application file locator list for which a personal identification number does not need to be verified; if verification fails, returning to the terminal a processing option instruction response containing an application file locator list for which a personal identification number must be verified; when determined that the received instruction is a record reading instruction, the IC card returning a record reading response to the terminal according to the record reading instruction, wherein the record reading response contains a method for verifying a card holder. Thus, the risk of a personal identification number being leaked is avoided, thus enhancing the security of a transaction, while also improving user experience.

21 Claims, 5 Drawing Sheets

(58) Field of Classification Search
USPC ................ 235/451, 439, 435, 380, 375, 487
See application file for complete search history.

IC CARD WITH FINGERPRINT RECOGNITION FUNCTION AND WORKING METHOD THEREOF

FIELD OF THE INVENTION

The present invention relates to an IC card with fingerprint recognition function and a working method thereof in the field of information security.

PRIOR ART

In prior art, it verifies a card holder identification, usually by verifying personal identification code, according to a card holder verified methods list returned by an IC card (Integrated Circuit Card) in the case that the IC card of EMV (Europay, MasterCard, Visa) standard is in a transaction. Nevertheless, the personal identification code is easily stolen when entered by a card holder, money in the account of the card holder may be stolen either, it's risky. On the other hand, if a card holder has many cards, he or she may forget the personal identification code of one of cards or may confuse the personal identification codes each other, it is not convenient for the card holder.

SUMMARY OF THE INVENTION

The object of the invention is to provide an IC card with fingerprint recognition function and a working method thereof, which avoids the card holder from leaking a personal identification code, meanwhile the card holder will not feel inconvenient because forgetting or confusing the personal identification codes.

Thus, according to one aspect of the present invention, there is provided a method for an IC card with fingerprint recognition function, comprising Step S1) waiting, by an IC card, for receiving a command from a terminal;

Step S2) determining, by the IC card, a type of the command when the command is received from the terminal, executing Step S3 in the case that the command is a selecting application command; executing Step S4 in the case that the command is an obtaining process option command; executing Step S5 in the case that the command is reading record command;

Step S3) selecting, by the IC card, an application and returning a response to the terminal, returns Step S1;

Step S4) obtaining, by the IC card, a verifying state of user's fingerprint information according to content of the command, returning a process option command response including an application file locator list which does not need to verify personal identification code to the terminal, and returning to Step S1 in the case that the verifying state of user's fingerprint information is a verified successfully state; returning the process option command response including application file locator list which needs to verify personal identification code to the terminal, and returning to Step S1; and Step S5) returning, by the IC card, a reading record response, which includes a verifying method of a card holder, to the terminal according to a reading record command, and returning to Step S1.

According to the other aspect of the present invention, there is provided an IC card with fingerprint recognition function, comprising a receiving module which is configured to receive a command from a terminal;

a first determining module which is configured to determine a type of the command which is received by the receiving module;

a first sending module which is configured to select an application and return a response to the terminal, and to trigger the receiving module when the first determining module determines that the received command is a selecting application command;

an obtaining state module which is configured to obtain the verifying state of user fingerprint information according to a content of the command when the first determining module determines the received command is the obtaining process option command; a second sending module which is configured to return a process option command response which include the application file locators list which does not need to verify a personal identification code to the terminal and to trigger the receiving module in the case that the verifying state obtained by the obtaining state module is a verifying successful state; to return a process option command response which includes the application file locators list which needs to verify a personal identification code and to trigger the receiving module in the case that the verifying state obtained by the obtaining state module is a verifying unsuccessful state; and a third sending module which is configured to return a reading record response, which includes the verifying method of a card holder, to the terminal according to the reading record command and to trigger the receiving module in the case that the first determining module determines that the received command is the reading record command.

On advantages of the present invention, a verification of user fingerprint information is added in a transaction with an IC card, thus the user does not need to input a personal identification code after the user finger information is verified successfully, in this way, the personal identification code avoids from being leaked out, which makes the transaction safer, meanwhile, the method avoids the user from forgetting the personal identification code.

BRIEF DESCRIPTION OF THE DRAWINGS

The technical solution in the Embodiments of the present invention is further described more clearly and completely with the drawings of the present invention. Apparently, Embodiments described herein are just a few embodiments of the present invention. On the basis of the embodiments, all other related embodiments which may be made by those skilled in the art without any inventive work belong to the scope of the invention.

EMBODIMENTS OF THE INVENTION

The technical solution in the Embodiments of the present invention is further described more clearly and completely with the drawings of the present invention. Apparently, Embodiments described herein are just a few embodiments of the present invention. On the basis of the embodiments, all other related embodiments which may be made by those skilled in the art without any inventive work belong to the scope of the invention.

Embodiment 1

Figure 1:
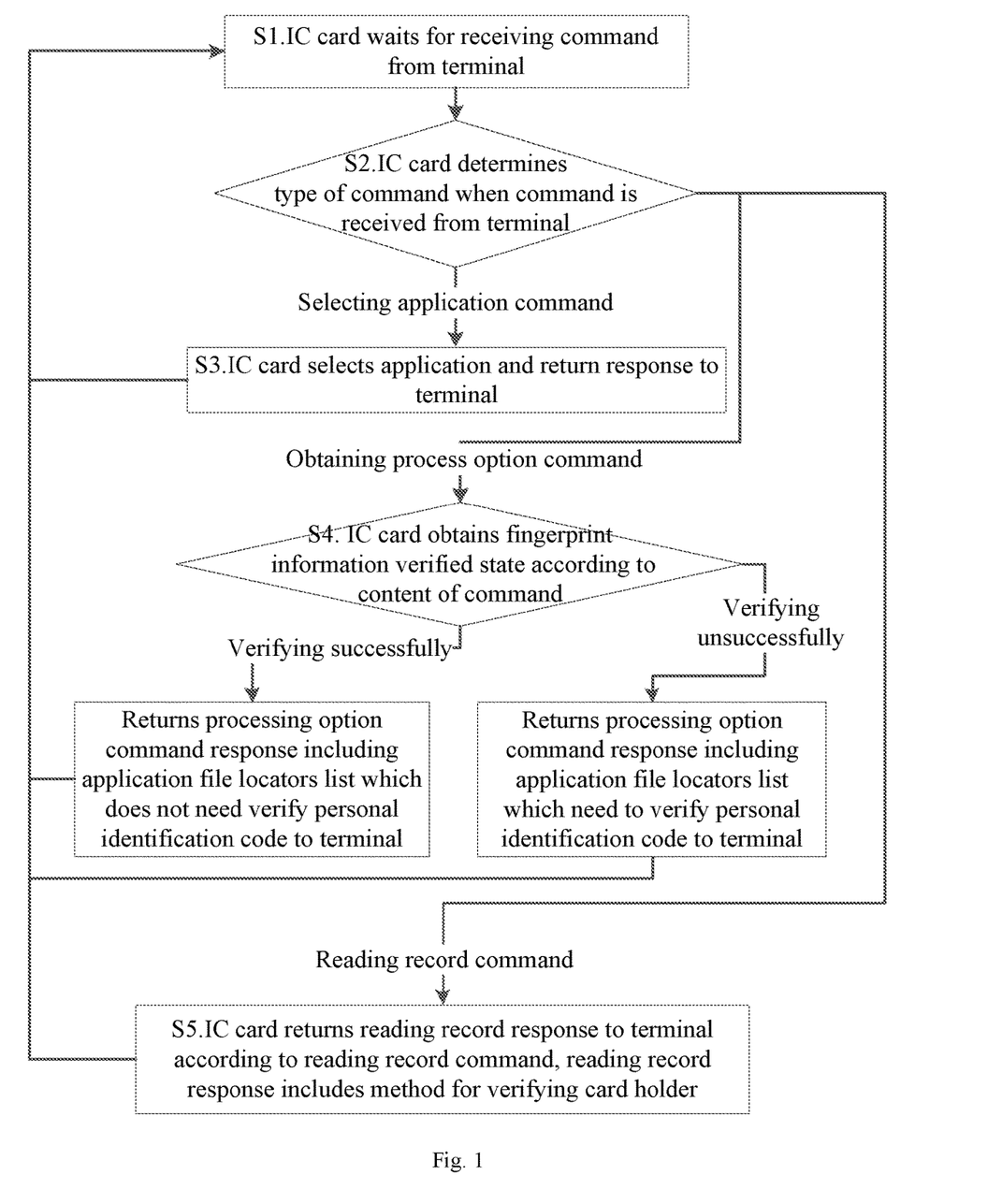
FIG. 1 shows a flow diagram of a working method for an IC card with fingerprint recognition function according to Embodiment 1 of the present invention.

It provides a working method for an IC card with fingerprint recognition function according to Embodiment 1 of the present invention, as shown in FIG. 1, comprising the following steps.

Step S1, an IC card waits for receiving a command from a terminal.

Step S2, the IC card determines a type of the command when the command is received from the terminal, executes Step S3 in the case that the command is a selecting application command; executes Step S4 in the case that the command is an obtaining process option command; executes Step S5 in the case that the command is a reading record command.

Step S3, the IC card selects an application and returns a response to the terminal, and returns Step S1.

Step S4, the IC card obtains a verifying state of user fingerprint information according to a content of command, returns a process option command response including application file locators list which does not need to verify the personal identification code to the terminal and returns to Step S1 in the case that the verifying state is verifying successful state; returns a process option command response including application file locators list which needs to verify the personal identification code to the terminal and returns to Step S1 in the case that the verifying state is verifying unsuccessful state.

Step S5, the IC card returns a reading record response, which includes a verifying method of card holder, to the terminal according to the reading record command, and returns to Step S1.

Preferably, Step S2 further includes that the IC card returns a contactless applications list supported by the IC card to the terminal and returns to Step S1 when the received command is a selecting near payment system environment command.

Preferably, Step S3 specifically is that the IC card selects an application from the contactless applications list and returns a response to the terminal, and returns to Step S1.

Preferably, Step S2 further includes that the IC card returns a contact applications list supported by the IC card to the terminal and returns to Step S1 when the received command is a selecting contact payment system environment command.

Preferably, Step S3 specifically is that the IC card selects an application from the contact applications list and returns a response to the terminal.

Preferably, Step S4 specifically is that the IC card obtains user fingerprint information when receiving the obtaining process option command, and verifies the user fingerprint information, and obtains the verifying state of user fingerprint information.

Preferably, before Step S4, the method further includes that the IC card obtains the user fingerprint information, and verifies the user fingerprint information to obtain the verifying state of user fingerprint information.

Preferably, the obtaining the user fingerprint information and verifying the user fingerprint information to obtain the verifying state of user fingerprint information specifically include that the IC card determines whether the user fingerprint information is obtained within a preset duration, if yes, verifies the user fingerprint information to obtain the verifying state of user fingerprint information; otherwise, sets the verifying state of user fingerprint information as verification time-out state.

Preferably, verifying the user fingerprint information so as to obtain the verifying state of user fingerprint information specifically includes that the IC card verifies the user fingerprint information obtained by the IC card according to fingerprint information stored by the IC card, sets the verifying state of user fingerprint information as the verifying successful state in the case that the user fingerprint information obtained by the IC card is verified successfully; while sets the verifying state of user fingerprint information as the verifying unsuccessful state in the case that the user fingerprint information obtained by the IC card is verified unsuccessfully.

Preferably, after the user fingerprint information is verified to obtain the verifying state of fingerprint information, the method further includes that an indicator lamp of the IC card displays a first state information when the verifying state of fingerprint information is the verifying successful state; the indicator lamp of the IC card displays a second state information when the verifying state of fingerprint information is the verifying unsuccessful state; the indicator lamp of the IC card displays a third state information when the verifying state of fingerprint information is the time-out state.

Preferably, before returning to Step S1, Step S5 further includes that the terminal determines whether the personal identification code needs to be input according to verifying method of card holder, if yes, receives the personal identification code input by the user, and returns to Step S1; otherwise, returns to Step S1 directly.

Preferably, Step S2 further includes that executes Step S6 in the case that the received command is an internal identification command; executes Step S7 in the case that the received command is a generating a first application cipher text command; executes Step S8 in the case that the received command is an external identification command; executes Step S9 in the case that the receiving command is a second application cipher text command.

Step S6, the IC card encrypts a random number included in the internal identification command to generate a signature dynamic application data, and returns an internal identification response which includes the signature dynamic application data to the terminal, and returns to Step S1.

Step S7, the IC card executes a card action analysis, generates the first application cipher text, returns the first application cipher text to the terminal, and returns to Step S1.

Step S8, the IC card verifies a third application cipher text in the external identification command, sends a verifying successful response to the terminal and returns to Step S1 in the case that the third application cipher text is verified successfully; sends a verifying unsuccessful response to the terminal and returns to Step S1 in the case that the third application cipher text is verified unsuccessfully.

Step S9, the IC card determines a type of verifying the third application cipher text response included in the generating the second application cipher text command, generates a transaction credentials and sends it to the terminal in the case that the response is the verifying successful response, and returns to Step S1; and generates an application identification cipher text and sends it to the terminal, and returns to Step S1 in the case that the response is the verifying unsuccessful response.

Preferably, the method further includes that the terminal determines whether the personal identification code needs to be input and whether the personal identification code is received from the user according to a verifying method of card holder.

Preferably, Step S7 further includes that the terminal receives the first application cipher text returned from the IC card, and sends the first application cipher text and the personal identification code to a server for being verified, and executes corresponding operations according to a verifying result returned from the server.

Preferably, Step S7 further includes that the terminal receives the first application cipher text returned from the IC card, sends the first application cipher text to the server to being verified, and executes corresponding operations according to the verifying result returned from the server.

Specifically, the terminal executing corresponding operations according to the verifying result returned from the server specifically includes that the terminal receives the verifying result returned from the server, the terminal obtains the third application cipher text from the verifying successful response sent from the server, and sends the external identification command including the third application cipher text to the IC card in the case that the response sent from the server is the verifying successful response; the terminal refuses transaction in the case that the response sent from the server is the verifying unsuccessful response.

Preferably, in the case that the determination is yes, Step S9 further includes that the terminal sends the received transaction credential to the server, ends the transaction.

In the case that the determination is no, Step S9 further includes that the terminal sends the received application identification cipher text to the server, and ends the transaction.

Preferably, Step S6 further includes that the terminal verifies the signature dynamic application date.

Preferably, the method further includes that the terminal executes the terminal risk management and the terminal action analysis.

Embodiment 2

Figure 2:
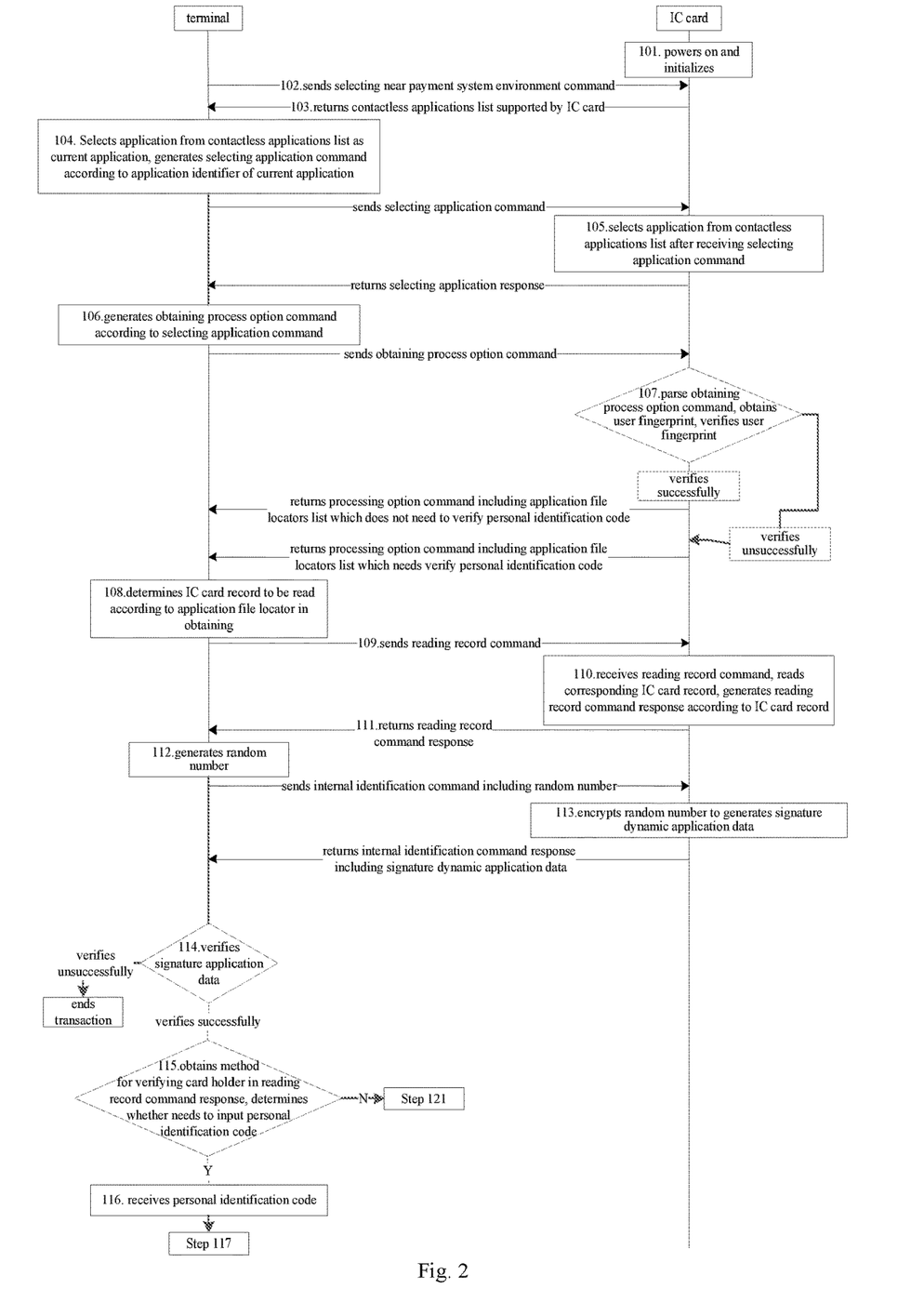
FIG. 2 and FIG. 3 show flow diagrams of the working method for an IC card with fingerprint recognition function according to Embodiment 2 of the present invention.
Figure 3:
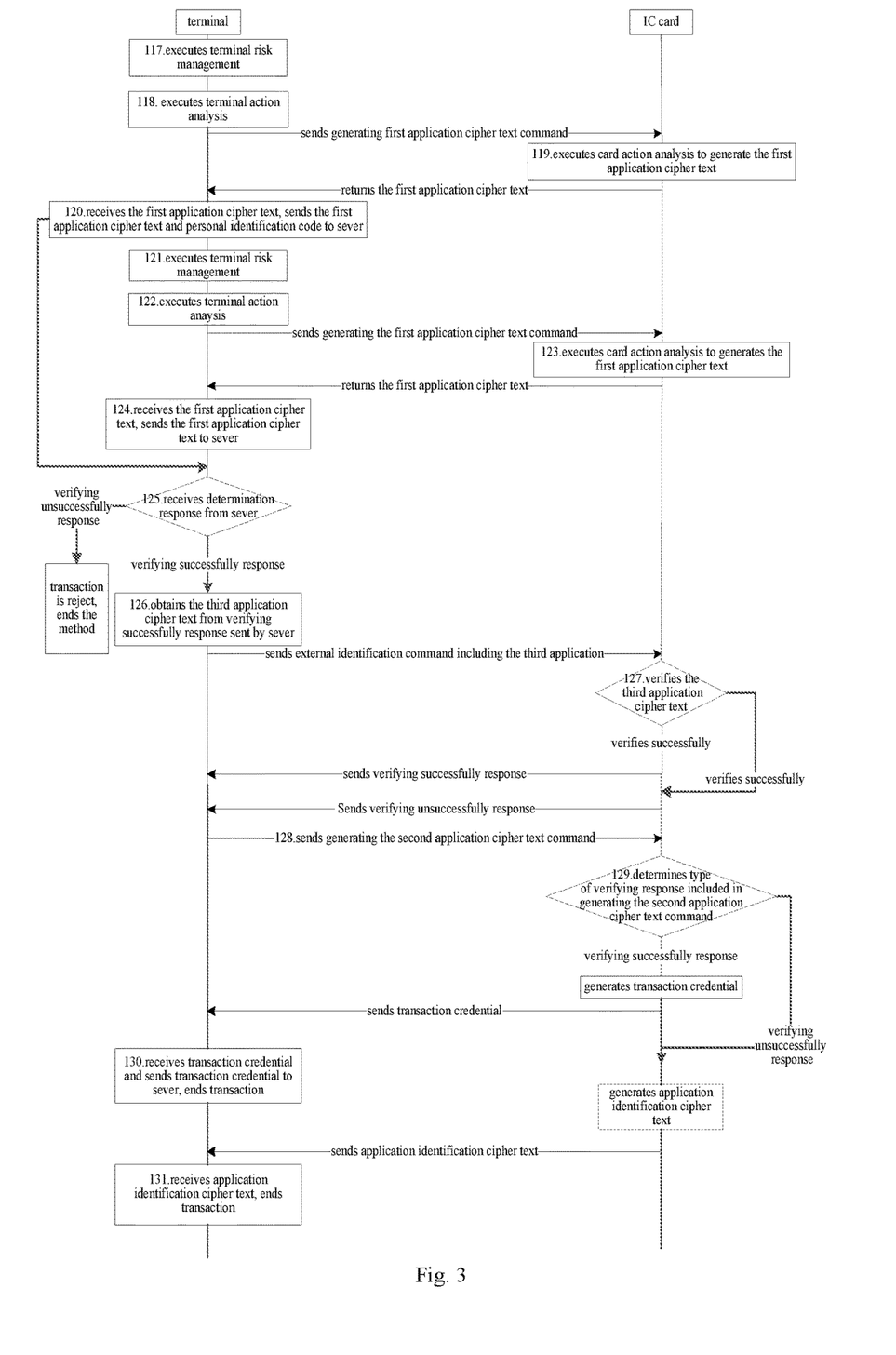

It provides a working method for an IC card with fingerprint recognition function according to Embodiment 2, as shown in FIG. 2 and FIG. 3, the method includes data interaction between the IC card and the terminal and operation of the terminal which comprise following steps:

Step 101, the IC card powers on and initializes;

Before Step 101, the method further includes a transaction preprocessing and obtaining authorization account.

Step 102, the terminal sends a selecting near payment system environment command to the IC card;

In Embodiment 2, the near payment system environment is a list composed of an application identification, an application label and an application precedence indicator which apply to the IC card, that actually is a contactless applications list which can be visited via a contactless interface. The list includes all of entrances of catalogs and is returned by the IC card in a file control information of selecting near payment system environment response.

In Embodiment 2, take sending the near payment system environment command as an example, it can take sending the selecting contact payment system environment command as an example; correspondingly, the contact payment system environment is a list composed of the application identification, the application label and the application precedence indicator which apply to the IC card, that actually is a contact applications list which can be visited via contact interface.

It needs to be noted that the terminal sends an expecting to return command response length command to the IC card after sending the selecting contact near payment system environment to the IC card; the IC card determines whether the expecting to return command response length is reasonable, if yes, the IC card returns the expecting length command response to the IC card; otherwise, returns error information and an actual response length to the terminal; the terminal resends the expecting to return command response length command to the IC card according to the actual response length returned from the IC card after receiving the error information returned from the IC card, and the IC card continues to determine whether the expecting to return command response length is reasonable, if yes, the IC card returns the expecting length command response to the terminal; otherwise, continues to send the error information and the actual response length to the terminal.

Correspondingly, the terminal sends the related commands to the IC card one after another, and also sends an expecting to return command response length command to the IC card.

Specifically, when the terminal communicates contactless with the IC card, the selecting near payment system environment command sent by the terminal to the IC card is 00 A4 04 00 0E 32 50 41 59 2E 53 59 53 2E 44 44 46 30 31 00; when the terminal communicates contact with the IC card, the selecting contact near payment system environment command sent by the terminal to the IC card is 00 A4 04 00 0E 31 50 41 59 2E 53 59 53 2E 44 44 46 30 31 0, the length of the response returned from the IC card to the terminal is 61 28, the expecting to return contact applications list length command returned from the terminal to the IC card is 00 C0 00 00 28;

Step 103, the IC card returns the contactless applications list which applies to the IC card to the terminal;

Specifically, when the terminal communicates contactlessly with the IC card, the contact applications list which applies to the IC card and is returned from the IC card to the terminal is 6F 34 84 0E 32 50 41 59 2E 53 59 53 2E 44 44 46 30 31 A5 22 BF 0C 1F 61 1D 4F 08 A0 00 00 03 33 01 01 01 50 0E 55 6E 69 6F 6E 50 61 79 20 44 65 62 69 74 87 01 01; when the terminal communicates contact with the IC card, the contact applications list which applies to the IC card and is returned from the terminal to the IC card is 6F 26 84 0E 31 50 41 59 2E 53 59 53 2E 44 44 46 30 31 A5 14 88 01 01 5F 2D 02 7A 68 9F 11 01 01 BF 0C 05 9F 4D 02 0B 0A.

Step 104, the terminal selects an application from the contactless applications list as a current application, generates the selecting application command according to an application identifier of the current application, and sends the selecting application command to the IC card;

Specifically, the terminal selects a default application from the contactless applications list as the current application, or the terminal displays application information in the contactless applications list for a user, and receives input by the user, and selects the application as the current application according to selecting information input by the user or confirmation input by the user.

In Embodiment 2, Step 103 can be replaced by the step that the IC card returns the contact applications list which applies to the IC card to the terminal;

Specifically, when the terminal communicates contactless with the IC card, the selecting application command returned from the terminal to the IC card is 00 A4 04 00 08 A0 00 00 03 33 01 01 01 00; when the terminal communicates contact with the IC card, the selecting application command sent from the terminal to the IC card is 00 A4 04 00 08 A0 00 00 03 33 01 01 01 00; the response length returned from the IC card to the terminal is 61 57; the expecting to return selecting response length command sent from the terminal to the IC card is 00 C0 00 00 57.

Step 105, the IC card selects an application from the contactless applications list after receiving the selecting application command, and returns the selecting application response to the terminal;

In Embodiment 2, the selecting response includes an application selected successfully response and an application selected unsuccessfully response; specifically, the IC card determines whether application corresponding to the application identifier in the selecting application command permits to be executed after receiving the selecting application command sent from the terminal, if yes, returns the application selected successfully response including the file control information to the terminal, the file control information includes a processing option data object list, and the IC card requests terminal data from the terminal via the processing option data object list; otherwise, returns the application selected unsuccessfully response to the terminal.

Specifically, when the terminal communicates contactless with the IC card, the selecting response returned from the IC card to the terminal is 6F 6B 84 08 A0 00 00 03 33 01 01 01 A5 5F 50 0E 55 6E 69 6F 6E 50 61 79 20 44 65 62 69 74 87 01 01 9F 38 1E 9F 66 04 9F 02 06 9F 03 06 9F 1A 02 95 05 5F 2A 02 9A 03 9C 01 9F 37 04 DF 60 01 DF 69 01 5F 2D 02 7A 68 9F 11 01 01 9F 12 0E 55 6E 69 6F 6E 50 61 79 20 44 65 62 69 74 BF 0C 0E 9F 4D 02 0B 0A DF 4D 02 0C 0A DF 61 01 C2; when the terminal communicates contact with the IC card, the selecting response returned from the IC card to the terminal is 6F 55 84 08 A0 00 00 03 33 01 01 01 A5 49 50 0E 55 6E 69 6F 6E 50 61 79 20 44 65 62 69 74 87 01 01 9F 38 0C 9F 7A 01 9F 02 06 5F 2A 02 DF 69 01 5F 2D 02 7A 68 9F 11 01 01 9F 12 0E 55 6E 69 6F 6E 50 61 79 20 44 65 62 69 74 BF 0C 0A 9F 4D 02 0B 0A DF 4D 02 0C 0A.

Step 106, the terminal generates an obtaining process option command according to the selecting application response, and sends the obtaining process option command to the IC card;

Specifically, when the terminal communicates contactless with the IC card, the processing option command sent from the terminal to the IC card is 80 A8 00 00 25 83 23 66 80 00 80 00 00 00 00 00 00 00 00 00 00 00 01 56 00 00 00 00 00 01 56 18 05 07 00 F7 31 5F 08 00 00 00; when the terminal communicates contact with the IC card, the processing option command sent from the terminal to the IC card is 80 A8 00 00 0C 83 0A 00 00 00 00 00 00 00 01 56 00 00 in the case that the IC card selects an application from the contact applications list, and the response length returned from the IC card to the terminal is 61 18; the expecting to return processing command response length command sent from the terminal to the IC card is 00 C0 00 00 18.

Step 107, the IC card parses the obtaining process option command to obtain a user fingerprint, and verifies the user fingerprint, returns the processing option command response including the application file locators list which does not need to verify personal identification code to the terminal in the case that the user fingerprint is verified successfully; returns the processing option command response including application file locators list which needs to verify personal identification code to the terminal in the case that the user fingerprint is verified unsuccessfully. Specifically, the IC card parses the obtaining process option command, prompts the user to input fingerprint information and receives the fingerprint information input by the user; the IC card verifies the fingerprint information input by the user according to the fingerprint information stored by itself, generates verification successful information if the fingerprint information input by the user is verified successfully, and returns the processing option command response including the application file locators list which does not need to verify personal identification code to the terminal; otherwise, generates verification unsuccessful information, and returns the processing option command response including the application file locators list which needs to verify personal identification code to the terminal.

More specifically, a chip of the IC card sends an obtaining fingerprint state command to a fingerprint collecting chip of the IC card after analyzing the obtaining process option command, and receives the fingerprint state from the fingerprint collecting chip to verify the fingerprint.

In Embodiment 2, before verifying the user fingerprint, the method further includes the IC card determines whether the user fingerprint is received within a preset duration, if yes, verifies the user fingerprint; otherwise, returns the processing option command response including the application file locators list which needs to verify personal identification code to the terminal when the time is out.

In Embodiment 2, an indicator lamp of the IC card displays a first state information when the IC card verifies the user fingerprint successfully; the indicator lamp of the IC card displays a second state information when the IC card verifies the user fingerprint unsuccessfully.

Specifically, in the case that the terminal communicates with the IC card via NFC (Near Field Communication), the processing option command response, which includes the application file locators list which does not need to verify personal identification code, returned from the IC card to the terminal is 80 16 7C00 08010200 10010301 10090900 18010300 20010100; the processing option command response, which includes application locators list which needs to verify personal identification code is 80 16 7C00 08010200 30010301 30090900 18010300 20010100.

In the case that the terminal communicates with the IC card via a contact way, the processing option command response, which includes the application file locators list which does not need to verify personal identification code, returned from the IC card to the terminal is 80 16 7C 00 08 01 02 00 10 01 03 01 10 09 09 00 18 01 03 00 20 01 01 00; the processing option command response, which includes the application file locators list which needs to verify personal identification code, returned from the IC card to the terminal is 80 16 7C00 08010200 30010301 30090900 18010300 20010100.

Step 108, the terminal determines an IC card record which is to be read according to the application file locator in the obtaining process option command response, and generates a reading record command.

Step 109, the terminal sends the reading record command to the IC card;

Specifically, in the case that the terminal communicates with the IC card via a contactless way, the reading record command sent from the terminal to the IC card is 00 B2 01 0C 00 00 B2 02 0C 00 00 B2 01 14 00 00 B2 02 14 00 00 B2 03 14 00 00 B2 09 14 00 00 B2 01 1C 00 00 B2 02 1C 00 00 B2 03 1C 00 00 B2 01 24 00 00 88 00 00 04; in the case that the terminal communicates with the IC card via the contact way, the reading record command sent from the terminal to the IC card is 00 B201 0C 00 00 B2 02 0C 00 00 B2 01 14 00 00B2 02 14 00 00B2 03 14 00 00B2 09 14 00 00 B2 01 1C 00 00 B2 02 1C 00 00 B2 03 1C 00 00 B2 01 24 00 00 88 00 00 04.

Step 110, the IC card receives the reading record command, reads a corresponding IC card record, and generates a reading record command response according to the read IC card record.

Step 111, the IC card returns the reading record command response to the terminal;

Specifically, in the case that the terminal communicates with the IC card via the contactless way, the reading record command response returned from the IC card to the terminal is 70 14 57 12 62 31 34 03 25 00 00 00 10 4D 27 01 22 02 21 00 27 0F 70 1B 5F 20 02 20 2F 9F 61 0F 00 00 00 00 00 00 00 00 00 00 00 00 00 00 00 9F 62 01 00 70 44 5F24 03 27 01 31 5A 0A 62 31 34 03 25 00 00 00 10 4F 9F 07 02 FF 00 8E 10 00000000000000001F03 9F 0D 05 D8 60 9C A8 00 9F 0E 05 00 10 00 00 00 9F 0F 05 D8 68 9C F8 00 5F 28 02 01 56 90 00 70 81 E5 9F 46 81 B0 6A 45 05 B1 01 A6 1A35 7F 0B 85 40 67 1A 86 38 1C E6 19 D4 4C F5 21 16 4B EE 16 38 A8 E7 58 C1 CD D1 1C EA 2D 08 D8 79 F2 CB 19 DD BE C1 5C FC BC 3F D3 F2 A3 68 E1 62 10 0A 26 84 45 1D 3B F3 AE 0D 2C CD 54 FD A5 BB C0 BB 05 B7 FADE 73 2F 80 FA 2A 77 7F FF 05 BF 91 01 C7 97 DB 79 42 4D A2 8B E2 2A AE 02 59 E7 7A E5 B1 FE 80 8C CF C1 F2 14 06 A3 CB 88 F1 AC FB E1 45 F3 9A 56 87 F6 09 C2 11 EA 9F 57 D7 59 9D 6A 97 CB 36 B5 27 49 43 9D C9 AE BB 77 1E F7 89 50 B3 76 CF AB A0 39 42 83 C9 99 B2 F8 6F BA 8A A5 5A 2E 75 E0 C2 15 9F 47 01 03 9F 48 2A C2 7B 03 53 38 96 55 4D CF D6 28 7B D5 4F 26 CF 2A FC 2F D6 3D B7 0B DE 11 75 21 8E 28 07 84 00 9D 29 0F 3D 98 24 C4 74 54 0D 90 00 70 81 BD 93 81 B0 0D 84 AE 18 30 DB 89 BB A2 3B 71 37 CA 95 A5 25 F9 22 5A F2 9D 3F 89 2A 67 5C 03 71 70 B5 DF B6 4B 90 0A F8 66 2B AE 9A F6 51 CA 7A FD 82 0C 7E 4A C5 B6 34 01 5F EE 84 E6 B9 BF B6 FD 5F 59 90 7B CA C3 16 CF 44 E4 2A 05 2B EF 50 20 62 AD 58 E6 46 C9 7B B9 E9 90 57 DB D5 97 0E 46 95 D1 93 DE C0 74 36 31 6D 59 B2 1E B5 0C 2B 82 53 23 17 DB D2 B1 11 7A 7F 2D 93 51 AA BA 62 A7 39 42 32 DF 09 FC 40 60 83 45 05 3A B5 1B EB CC C4 43 3B C9 B6 93 C5 32 82 01 CC 94 04 80 EF D5 47 3D D9 BB 38 76 5A 49 F4 3C 9C 23 B7 F0 FA BA 48 5C 4F 9F 4A 01 82 9F 49 03 9F 37 04 70 04 5F 34 01 00 70 81 FB 90 81 F8 73 92 02 2B 01 2F 43 51 78 B7 70 82 9B 2C 0C 72 66 CD 32 22 E1 D6 78 BD 1D C9 57 7D 66 4C 9C F7 37 8B 5D 0F D1 D3 90 36 04 6E E6 22 13 65 34 5D 22 57 93 C2 3E 9D D4 CA 98 82 9E 00 43 9C 26 C6 D0 2A 9E 4F 4E BD F5 52 92 DE 51 80 AB CB 69 C9 12 C2 26 20 09 07 19 58 94 18 10 3E 0B 42 56 37 EE 7F 3F 23 31 CC F0 27 E6 4E D9 CC 61 2D F3 6C C4 AF D5 F7 BE 00 96 2A D6 F9 10 24 DB 57 3C B3 10 D9 91 C6 EA F9 95 4A 01 34 2F D1 1F B3 AE B5 48 19 AD FD 5C C7 13 5F 6A DC; in the case that the terminal communicates with the IC card via the contact way, the reading record command response returned from the IC card to the terminal is 70 14 57 12 62 31 34 03 25 00 00 00 10 4D 27 01 22 02 21 00 27 0F 70 1B 5F 20 02 20 2F 9F 61 0F 00 00 00 00 00 00 00 00 00 00 00 00 00 00 00 9F 62 01 00 70 44 5F 24 03 27 01 31 5A 0A 62 31 34 03 25 00 00 00 10 4F 9F 07 02 FF 00 8E 10 00000000000000001F03 9F 0D 05 D8 60 9C A8 00 9F 0E 05 00 10 00 00 00 9F 0F 05 D8 68 9C F8 00 5F 28 02 01 56 90 00 70 81 E5 9F 46 81 B0 6A 45 05 B1 01 A6 1A 35 7F 0B 85 40 67 1A 86 38 1C E6 19 D4 4C F5 21 16 4B EE 16 38 A8 E7 58 C1 CD D1 1C EA 2D 08 D8 79 F2 CB 19 DD BE C1 5C FC BC 3F D3 F2 A3 68 E1 62 10 0A 26 84 45 1D 3B F3 AE 0D 2C CD 54 FD A5 BB C0 BB 05 B7 FA DE 73 2F 80 FA 2A 77 7F FF 05 BF 91 01 C7 97 DB 79 42 4D A2 8B E2 2A AE 02 59 E7 7A E5 B1 FE 80 8C CF C1 F2 14 06 A3 CB 88 F1 AC FB E1 45 F3 9A 56 87 F6 09 C2 11 EA 9F 57 D7 59 9D 6A 97 CB 36 B5 27 49 43 9D C9 AE BB 77 1E F7 89 50 B3 76 CF AB A0 39 42 83 C9 99 B2 F8 6F BA 8A A5 5A 2E 75 E0 C2 15 9F 47 01 03 9F 48 2A C2 7B 03 53 38 96 55 4D CF D6 28 7B D5 4F 26 CF 2A FC 2F D6 3D B7 0B DE 11 75 21 8E 28 07 84 00 9D 29 0F 3D 98 24 C4 74 54 0D 90 00 70 81 BD 93 81 B0 0D 84 AE 18 30 DB 89 BB A2 3B 71 37 CA 95 A5 25 F9 22 5A F2 9D 3F 89 2A 67 5C 03 71 70 B5 DF B6 4B 90 0A F8 66 2B AE 9A F6 51 CA 7A FD 82 0C 7E 4A C5 B6 34 01 5F EE 84 E6 B9 BF B6 FD 5F 59 90 7B CA C3 16 CF 44 E4 2A 05 2B EF 50 20 62 AD 58 E6 46 C9 7B B9 E9 90 57 DB D5 97 0E 46 95 D1 93 DE C0 74 36 31 6D 59 B2 1E B5 0C 2B 82 53 23 17 DB D2 B1 11 7A 7F 2D 93 51 AA BA 62 A7 39 42 32 DF 09 FC 40 60 83 45 05 3A B5 1B EB CC C4 43 3B C9 B6 93 C5 32 82 01 CC 94 04 80 EF D5 47 3D D9 BB 38 76 5A 49 F4 3C 9C 23 B7 F0 FA BA 48 5C 4F 9F 4A 01 82 9F 49 03 9F 37 04 70 04 5F 34 01 00 70 81 FB 90 81 F8 73 92 02 2B 01 2F 43 51 78 B7 70 82 9B 2C 0C 72 66 CD 32 22 E1 D6 78 BD 1D C9 57 7D 66 4C 9C F7 37 8B 5D 0F D1 D3 90 36 04 6E E6 22 13 65 34 5D 22 57 93 C2 3E 9D D4 CA 98 82 9E 00 43 9C 26 C6 D0 2A 9E 4F 4E BD F5 52 92 DE 51 80 AB CB 69 C9 12 C2 26 20 09 07 19 58 94 18 10 3E 0B 42 56 37 EE 7F 3F 23 31 CC F0 27 E6 4E D9 CC 61 2D F3 6C C4 AF D5 F7 BE 00 96 2A D6 F9 10 24 DB 57 3C B3 10 D9 91 C6 EA F9 95 4A 01 34 2F D1 1F B3 AE B5 48 19 AD FD 5C C7 13 5F 6A DC.

In Embodiment 2, the reading record response includes a method for verifying card holder.

Step 112, the terminal generates a random number, sends an internal verifying command including the random number to the IC card.

In Embodiment 2, before the terminal generates the random number, the method further includes that the terminal obtains a CA (certificate authority) public key, an issuer public key and an IC card public key successively.

Specifically, in the case that the terminal communicates with the IC card via the contactless way, the internal verifying command sent from the terminal to the IC card is 00 88 00 00 04 F7 31 5F 08; in the case that the terminal communicates with the IC card via the contact way, the internal verifying command sent from the terminal to the IC card is 00 88 00 00 04 F7 31 5F 08; in the case that terminal communicates with the IC card via the contact way, the internal verifying command sent from the terminal to the IC card is 00 88 00 00 04 F7 31 5F 08; a response length returned from the IC card to the terminal is 65 B3, an expecting to return internal verifying command response length command sent from the terminal to the IC card is 00 C0 00 00 B3.

Step 113, the IC card encrypts the random number to generate signature dynamic application data, and returns the internal verifying command response including the signature dynamic application data to the IC card;

Specifically, in the case that the terminal communicates with the IC card via the contactless way, the internal verifying command sent from the IC card to the terminal is 80 81 B0 7B 30 82 FE 6C 62 A6 CB 9E B5 1E B3 4A 8C 6E A5 35 65 C4 30 3E 91 C5 48 1D 78 15 9A 68 AC 84 F6 3E 25 1B D4 EF 0D 8A C1 D7 B1 FB BC E6 C6 4A A6 67 A6 C2 A5 11 D4 B8 FB EB FC BE AD BD 1C F7 E0 3F 8D FC AE 1E A7 21 6C 9C CB 15 9A 5D 1B 6D 17 39 DD 44 D9 F4 94 A5 26 6D 6D B6 13 CF 95 5B 7A DA F6 D6

EB 7F 45 32 03 11 7C B8 50 CB 50 7B 8D 53 6D 78 76 DC 42 03 CA 9E 92 49 55 EC 9D 16 5D 3E D1 F5 9B 2A 4B FC 16 D5 6A 75 A2 B2 9B 1D AE 61 33 99 BF 05 CA 32 DC 38 FB 05 A1 65 5E 98 B9 DD 50 B4 DA 10 AE A4 65 51 1E D1 F7 B4 B8 84 8D; in the case that the terminal communicates with the IC card via the contact way, the internal verifying response sent from the IC card to the terminal is 83 BB A7 0F 1D 64 C4 B3 25 58 C1 CA C2 96 71 7A FF DD 8C 15 67 BA DC 11 84 99 B1 CF BB 58 6B FE EC B2 71 85 96 A7 68 04 EF 4E 74 CF F2 98 C8 9A 7A 6B FA 76 B2 77 C9 76 B7 DB E9 D0 D0 FE A6 35 80 FC 0D 13 D7 37 F2 1B 1E 66 81 D6 BA 0A BF 91 5B 71 E6 DB 5B C2 61 34 FD B7 95 89 EE 02 F7 20 C5 63 D3 95 21 9F 3D 07 7C 1B E2 38 55 F3 A9 4C 06 55 10 C6 E3 F4 D7 EE 9F A0 56 6C 71 F3 0E D8 B5 43 97 60 5E 96 D1 FD 05 0F 1B EB BA 7A 0C FA EC 5A 51 8F 5F 4D 0F 6F 7C 27 4B D9 EE 11 3A EA E5 F4 51.

Step 114, the terminal verifies the signature application data, the transaction is ended in the case that the signature application data is verified unsuccessfully; executes Step 115 in the case that the signature application data is verified successfully;

In Embodiment 2, the terminal verifies the signature application data by using the IC card public key.

Step 115, the terminal obtains the method for verifying card holder from the reading record command, determines whether the personal identification code needs to be input, if yes, executes Step 116; otherwise, executes Step 121;

Step 116, the terminal receives the personal identification code, and executes Step 117;

In Embodiment 2, Step 116 further includes that the terminal determines whether the personal identification code input by the user is correct, if yes, executes Step 117; otherwise, reports an error.

For instance, the personal identification code received by the terminal is 123456.

Step 117, the terminal operates a terminal risk management;

Specifically, the terminal uses a getting data command to obtain a last time online application serial number register and an application counter from the IC card, and if data to be read is obtained successfully, the IC card returns 9000.

Step 118, the terminal operates a terminal action analysis, and sends a generating a first application cipher text command to the IC card;

In Embodiment 2, the terminal determines whether the transaction is approval or refusal according to the terminal action analysis.

Specifically, in the case that the terminal communicates with the IC card via contactless communication, the first generating application cipher text command sent from the terminal to the IC card is 80 AE 80 00 34 00 00 00 00 00 00 00 00 00 00 00 00 01 56 00 00 04 60 00 01 56 18 05 07 00 F7 31 5F 08 16 20 59 50 42 4F 43 20 4D 61 73 74 65 72 20 54 65 73 74 00 00 00 00 00; in the case that the terminal communicates with the IC card via the contact way, the first generating application cipher text command sent from the terminal to the IC card is 80 AE 80 00 34 00 00 00 00 00 00 00 00 00 00 00 00 01 56 00 00 04 60 00 01 56 18 05 07 00 75 74 01 7E 16 20 24 50 42 4F 43 20 4D 61 73 74 65 72 20 54 65 73 74 00 00 00 00 00; the response length returned from the IC card to the terminal is 61 20, the expecting to return the first application cipher text length command sent from the terminal to the IC card is 00 C0 00 00 20.

Step 119, the IC card executes the card action analysis to generate a first application cipher text, and returns the first application cipher text to the terminal;

In the card action analysis, the IC card determines whether the transaction is approval according to the result of an additional risk management.

Specifically, in the case that the terminal communicates with the IC card via the contactless way, the first application cipher text returned from the IC card to the terminal is 80 1E 80 00 05 5B DC 2D 7A E9 36 24 6E 07 01 01 03 A0 20 02 01 0A 01 00 00 00 00 00 5D F6 26 96; in the case that the terminal communicates with the IC card via the contact way, the first application cipher text returned from the IC card to the terminal is 80 1E 80 00 04 29 D4 BB 1F EC AF A3 96 07 01 01 03 A0 20 02 01 0A 01 00 00 00 00 00 D3 87 CA E9.

Step 120, the terminal receives the first application cipher text, and sends the first application cipher text and the personal identification code to the server, and executes Step 125.

Step 121, the terminal executes the terminal risk management;

Specifically, the terminal obtains the last time online application transaction serial number register and the application transaction counter from the IC card by using the get data command, if the terminal get the data to be read successfully, the IC card returns 9000 to the terminal.

Step 122, the terminal executes the terminal action analysis, and sends the first generating application cipher text command to the IC card;

In Embodiment 2, the terminal determines whether the transaction is approval or refusal according to the result of the terminal action analysis.

Specifically, in the case that the terminal communicates with the IC card via contactless way, the first generating application cipher text command sent from the terminal to the IC card is 80 AE 80 00 34 00 00 00 00 00 00 00 00 00 00 00 00 01 56 00 00 04 60 00 01 56 18 05 07 00 F7 31 5F 08 16 20 59 50 42 4F 43 20 4D 61 73 74 65 72 20 54 65 73 74 00 00 00 00 00; in the case that the terminal communicates with the IC card via contact way, the first generating application cipher text command sent from the terminal to the IC card is 80 AE 80 00 34 00 00 00 00 00 00 00 00 00 00 00 00 01 56 00 00 04 60 00 01 56 18 05 07 00 75 74 01 7E 16 20 24 50 42 4F 43 20 4D 61 73 74 65 72 20 54 65 73 74 00 00 00 00 00; the response length returned from the IC card to the terminal is 61 20; the expecting to return the first application cipher text length command sent from the terminal to the IC card is 00 C0 00 00 20.

Step 123, the IC card executes the card action analysis, generates the first application cipher text, and returns the first application cipher text to the terminal;

In card action analysis, the IC card determines whether agree with the transaction in the terminal action analysis is approval or reject according to additional risk management.

Specifically, in the case that the terminal communicates with the IC card via contactless way, the first application cipher text returned from the IC card to the terminal is 80 1E 80 00 05 5B DC 2D 7A E9 36 24 6E 07 01 01 03 A0 20 02 01 0A 01 00 00 00 00 00 5D F6 26 96; in the case that the terminal communicates with the IC card via contact way, the first application cipher text returned from the terminal to the IC card is 80 1E 80 00 04 29 D4 BB 1F EC AF A3 96 07 01 01 03 A0 20 02 01 0A 01 00 00 00 00 00 D3 87 CA E9.

Step 124, the terminal receives the first application cipher text, and sends the first application cipher text to the server, and executes Step 125.

Step 125, the terminal receives a determination response from the server, executes Step 126 in the case that the determination response is a verifying successfully response;

rejects the transaction and ends the method in the case that the termination response is a verifying unsuccessfully response.

In Embodiment 2, the server receives and verifies the data sent from the terminal, generates a third application cipher text, and sends the verifying successfully response and the third application cipher text to the terminal if the data is verified successfully; while sends the verifying unsuccessfully response to the terminal if the data is verified unsuccessfully.

Step 126, the terminal obtains the third application cipher text from the verifying successfully response sent from the server, and sends an external verification command including the third application cipher text to the IC card;

Specifically, in the case that the terminal communicates with the IC card via the contactless way, the external verification command sent from the terminal to the IC card is 00 82 00 00 0A 15 3C C7 6E 4B 6F C4 1D 30 30; in the case that the terminal communicates with the IC card via the contact way, the external verification command sent from the terminal to the IC card is 00 82 00 00 0A 15 3C C7 6E 4B 6F C4 1D 30 30.

Step 127, the IC card verifies the third application cipher text, sends the verifying unsuccessfully response to the terminal in the case that the third application cipher text is verified unsuccessfully; sends the verifying successfully response to the terminal in the case that the third application cipher text is verified successfully;

Specifically, in the case that the terminal communicates with the IC card via the contactless way, the verifying unsuccessfully response sent from the IC card to the terminal is 90 00; in the case that the terminal communicates with the IC card via the contact way, the verifying successfully response sent from the IC card to the terminal is 67 00; in the case that the terminal communicates with the IC card via the contact way, the verifying unsuccessfully response sent from the IC card to the terminal is 90 00; in the case that the terminal communicates with the IC card via the contact way, the verifying successfully response sent from the IC card to the terminal is 67 00.

Step 128, the terminal sends a generating the second application cipher text command to the IC card;

Specifically, in the case that the terminal communicates with the IC card via the contactless way, the generating the second application cipher text sent from the terminal to the IC card is 80 AE 40 00 22 30 30 00 00 00 00 00 00 00 00 00 00 00 00 01 56 00 00 04 60 00 01 56 18 05 07 00 F7 31 5F 08 16 20 59 00; in the case that the terminal communicates with the IC card via the contact way, the generating the second application cipher text command sent from the terminal to the IC card is 80 AE 40 00 22 30 30 00 00 00 00 00 00 00 00 00 00 00 00 01 56 00 00 04 60 00 01 56 18 05 07 00 75 74 01 7E 16 20 24 00; the response length returned from the IC card to the terminal is 69 85, the expecting to return the first application cipher text length command sent from the terminal to the IC card is 00 C0 00 00 20.

Step 129, the IC card determines a type of the verifying response included in the generating the second application cipher text command, generates a transaction credential and sends the transaction credential to the terminal, and executes Step 130 if the verifying response is the verifying successfully response; generates the application identifying cipher text, and sends the application identifying cipher text to the terminal, and executes Step 131 if the verifying response is the verifying unsuccessfully response.

In the case that the terminal communicates with the IC card via the contactless way, the transaction credential sent from the IC card to the terminal is 80 1E 40 00 05 24 EA 89 74 EF 13 D3 03 07 01 01 03 60 20 02 01 0A 01 00 00 00 00 00 5D F6 26 96; the application identifying cipher text sent from the IC card to the terminal is 80 1E 00 00 02 5F 67 30 6E 9E 59 BB 41 07 02 01 03 21 B0 02 01 0A01 00 00 00 00 00 5A B6 22 4B.

In the case that the terminal communicates with the IC card via the contact way, the transaction credential sent from the IC card to the terminal is 80 1E 40 00 04 03 81 F5 6D D4 17 FD 35 07 01 01 03 60 20 02 01 0A 01 00 00 00 00 00 D3 87 CA E9; the application identifying cipher text sent from the IC card to the terminal is 80 1E 00 00 05 5D 71 AC 84 B9 3A B4 4B 07 02 01 03 21 B0 02 01 0A 01 00 00 00 00 00 FF DC 7A FE.

Step 130, the terminal receives the transaction credential and sends the transaction credential to the server, ends the transaction.

Figure 4:
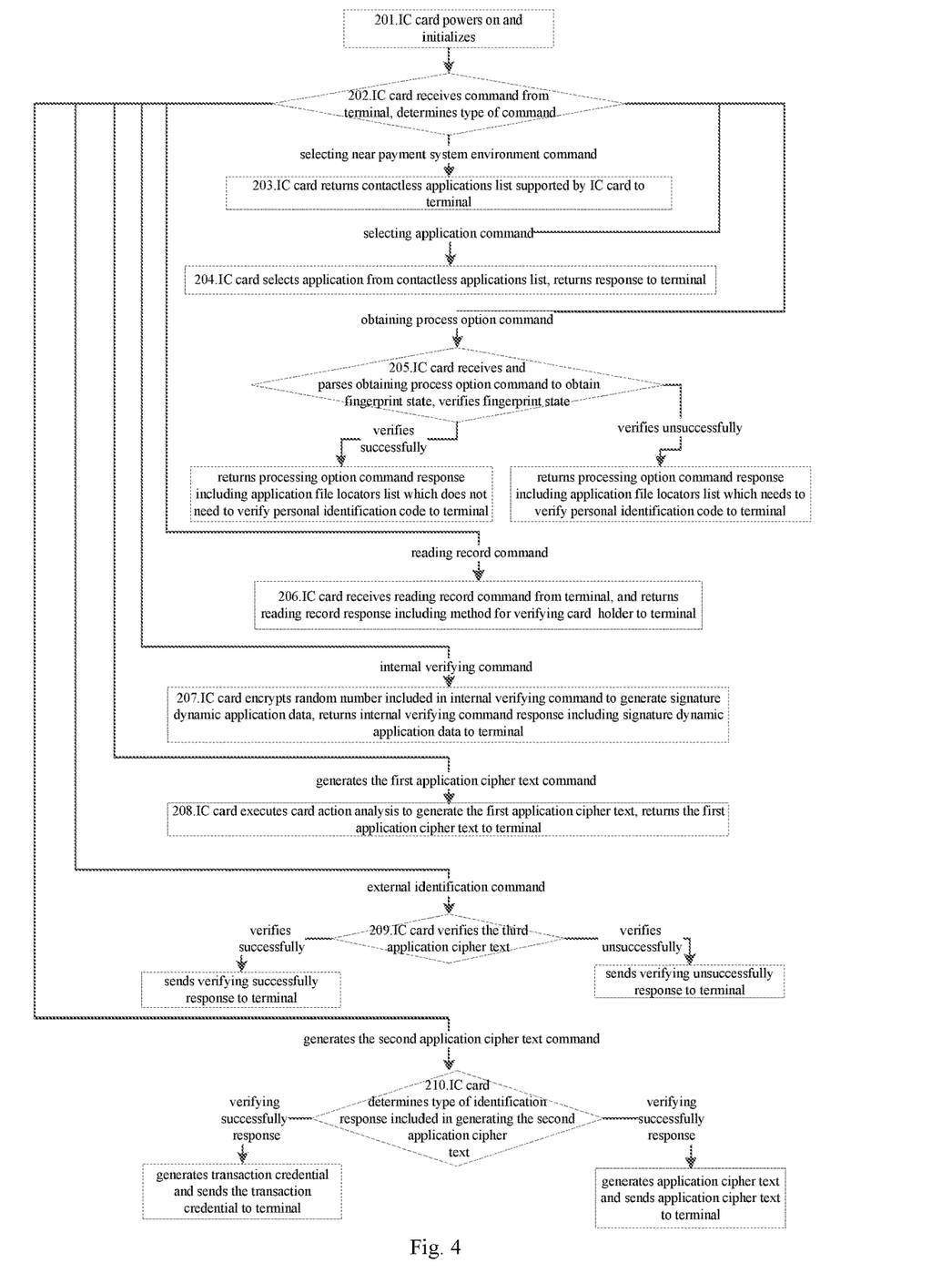
FIG. 4 shows a flow diagram of the working method for an IC card with fingerprint recognition function according to Embodiment 3 of the present invention.

Step 131, the terminal receives the application identifying cipher text, and ends the transaction. Embodiment 3:

It provides a working method for an IC card with fingerprint identification function according to Embodiment 3 of the present invention, as shown in FIG. 4, including the following steps.

Step 201, an IC card powers on and initialized.

Step 202, the IC card receives a command from the terminal, determines a type of the command, executes Step 203 in the case that the command is a selecting near payment system environment command; executes Step 204 in the case that the received command is a selecting application command; executes Step 205 in the case that the received command is an obtaining process option command; executes Step 206 in the case that the received command is a reading record command; executes Step 207 in the case that the received command is an internal verifying command; executes Step 208 in the case that the received command is a generating the first application cipher text command; executes Step 209 in the case that the received command is an external verifying command; executes Step 210 in the case that the received command is a generating the second application cipher text command.

Step 203, the IC card returns a contactless applications list supported by the IC card to the terminal.

In Embodiment 3, the terminal selects an application from the contactless applications list as the current application after receiving the contactless applications list, and generates the selecting application command according to an application identifier of the current application, and sends the selecting application command to the IC card.

Specifically, the terminal automatically selects a default application from the applications list as the current application, or the terminal displays the application information of the applications list, receives input from a user, and selects an application as the current application according to the selecting information or confirmation input by the user.

In Embodiment 3, in the case that the IC card determines the received command is the selecting contact payment system environment command, the IC card returns the contact applications list supported by the IC card to the terminal; it needs to be noted that the terminal continues to send the expecting to return response length command to the IC card after sending the selecting contact near payment system environment command to the IC card, the IC card determines the expecting to return response length is correct, if yes, the IC card returns the expecting length response to the terminal; otherwise, returns error information and actual response length to the terminal.

Step 204, the IC card selects an application from the contactless applications list, and returns a selecting response to the terminal.

In Embodiment 3, the selecting response includes a selecting application successfully response and a selecting application unsuccessfully response; specifically, the IC card determines whether an application, which corresponds to the application identifier in the selecting application command is permitted to be executed after receiving the selecting application command from the terminal, if yes, returns the selecting application successfully response including the file control information to the terminal, the file control information includes the processing option data object list, the IC card requests terminal data from the terminal via the processing option data object list; otherwise, returns the selecting application unsuccessfully response to the terminal.

Step 205, the IC card receives and parses the obtaining process option command from the terminal to obtain a fingerprint state, and verifies the fingerprint state, returns the processing option command response including the application file locators list which does not need to verify the personal identification code if the fingerprint state is verified successfully; and returns the processing option command response including the application file locators list which needs to verify the personal identification code to the terminal.

Specifically, the IC card parses the obtaining process option command, prompts the user to input the fingerprint information and receives the fingerprint information from the user; the IC card verifies the fingerprint information input by the user via the fingerprint information stored by itself, generates a verifying successfully response and returns the processing option command response including the application file locators list which does not need to verify the personal identification code in the case that the fingerprint information input by the user is verified successfully; otherwise, generates a verifying unsuccessfully response information, and returns the processing option command response including the application file locators list which needs to verify the personal identification code to the terminal.

More specifically, a chip of the IC card sends the obtaining fingerprint state command to a fingerprint collecting module of the IC card after the chip parses the obtaining process option command, and receives the fingerprint state returned from the fingerprint collecting chip to verify the fingerprint state.

In Embodiment 3, before the fingerprint is verified, the method further includes that the IC card determines whether a user fingerprint is received within a preset duration, if yes, verifies the user fingerprint, otherwise, returns the processing option command response including the application file locators list which needs to verify the personal identification code to the terminal in the case that the time is out.

Step 206, the IC card receives the reading record command from the terminal, returns the reading record response including a card holder verified method to the terminal;

Step 207, the IC card encrypts the random number included in the internal verifying command to generate a signature dynamic application data, and returns the internal verifying command response including the signature dynamic application data to the terminal;

Step 208, the IC card executes the card action analysis to generate the first application cipher text, and returns the first application cipher text to the terminal.

It needs to be noted that in the case that the personal identification code does not need to be verified, the terminal sends the first application cipher text to the server after the terminal receives the first application cipher text returned from the IC card; in the case that the personal identification code needs to be verified, the terminal sends the first application cipher text and the personal identification code to the server after the terminal receives the first application cipher text.

Step 209, the IC card verifies the third application cipher text, sends the verifying successfully response to the terminal in the case that the third application cipher text is verified successfully; sends the verifying unsuccessfully response to the terminal in the case that the third application cipher text is verified unsuccessfully.

Step 210, the IC card determines whether the type of the verifying response included in the generating the second application cipher text command, generates the transaction credential and sends the transaction credential to the terminal if the verifying response is the verifying successfully response; and generates the application verifying cipher text and sends the application verifying cipher text to the terminal in the case that the verifying response is the verifying unsuccessfully response.

Embodiment 4

Figure 5:
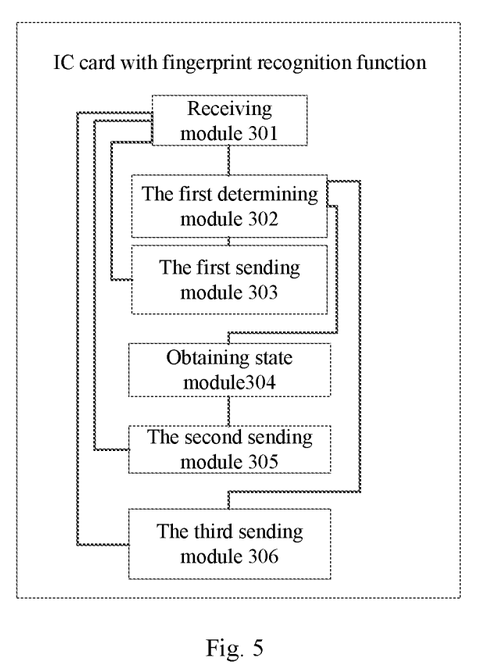
FIG. 5 shows a block diagram of an IC card with fingerprint recognition function.

It provides an IC card with fingerprint recognition function according to Embodiment 4 of the present invention, as shown in FIG. 5, comprising a receiving module 301 which is configured to receive a command from the terminal;

a first determining module 302 which is configured to determine a type of command received by the receiving module 301;

a first sending module 303 which is configured to select an application and return a response to the terminal, and to trigger the receiving module 301 in the case that the first determining module 302 determines that the received command is a selecting application command;

an obtaining state module 304 which is configured to obtain a user fingerprint information verifying state according to the command in the case that the first determining module 302 determines that the received command is an obtaining process option command;

a second sending module 305 which is configured to return a processing option command response including an application file locators list which does not need to verify personal identification code to the terminal in the case that the obtaining state module 304 obtains a verifying successfully state, and to trigger the receiving module 301; return the processing option command response including the application file locators list which needs to verify personal identification code to the terminal in the case that the obtaining state module 304 obtains a verifying unsuccessfully state, and to trigger the receiving module 301; and a third sending module 306 which is configured to return a reading record response to the terminal according to a reading record command in the case that the first determining module 302 determines the received command is a reading record command, and trigger the receiving module 301; the reading record response includes a method for verifying a card holder.

Preferably, the IC card further includes a fourth sending module which is configured to return a contactless applications list supported by the IC card to the terminal in the case that the first determining module 302 determines that the received command is a selecting near payment system environment command.

Preferably, the first sending module 303 is specifically configured to select an application from the contactless applications list and return a response to the terminal in the case that the first determining module 302 determines that the received command is the selecting application command, return to Step S1.

Preferably, the IC card further includes the fourth sending module which is configured to return a contact applications list to the terminal in the case that the first determining module 302 determines the received command is the selecting contact payment system environment command.

Preferably, the first sending module 303 is specifically configured to select an application from the contact applications list and return the response to the terminal in the case that the first determining module 302 determines that the received command is the selecting application command, return to Step S1.

Preferably, the obtaining state module 304 includes an obtaining unit and a verifying unit;

the obtaining unit which is configured to obtain user fingerprint information in the case that the first determining module 302 determines the received command is an obtaining process option command; and the verifying unit which is configured to verify the user fingerprint information obtained by the obtaining unit, and get a fingerprint information verified state.

Preferably, the obtaining state module 304 further includes a first setting unit;

the obtaining unit is specifically configured to determine whether the user fingerprint information is obtained within the preset duration;

the verifying unit is specifically configured to verify the user fingerprint information obtained by the obtaining unit to obtain the fingerprint information verified state in the case that the obtaining unit determines that the user fingerprint information is obtained within the preset duration; and the first setting unit is configured to set the user fingerprint information verified state as verification time out state in the case that the obtaining unit determines that the user fingerprint information is not obtained within the preset duration.

Preferably, the obtaining state module 304 further includes a second setting unit;

a verifying unit is specifically configured to verify the user fingerprint information obtained by the IC card according to the fingerprint information stored by itself; and the second setting unit is configured to set the user fingerprint information verified state as the verifying successfully state in the case that the user fingerprint information obtained by the IC card is verified successfully; to set the user fingerprint information verified state as the verifying unsuccessfully state in the case that the user fingerprint information obtained by the IC card is verified unsuccessfully.

Preferably, the obtaining state module 304 further includes a displaying unit;

the displaying unit is configured to control an indicator lamp of the IC card to display a first state information in the case that the verifying unit determines that the fingerprint information verified state is the verifying successfully state; control the indicator lamp of the IC card to display a second state information in the case that the verifying unit determines that the fingerprint information verified state is the verifying unsuccessfully state; and control the indicator lamp of the IC card to display a third state information in the case that the verifying unit determines that the fingerprint information verified state is the verifying time-out state.

Preferably, the IC card further includes an obtaining module and a first verifying module;

the obtaining module is configured to obtain the user fingerprint information in the case that the first determining module 302 determines that the received command is the obtaining process option command; and the first verifying module is configured to verify the user fingerprint information obtained by the obtaining module to obtain the fingerprint information verified state.

Preferably, the IC card further includes a first setting module;

the obtaining module is specifically configured to determine whether the user fingerprint information is obtained within the preset duration;

the first verifying module is specifically configured to verify the user fingerprint information obtained by the obtaining module to obtain the fingerprint information verified state in the case that the obtaining module determines that the user fingerprint information is obtained within the preset duration; and the first setting unit is configured to set the user fingerprint information verified state as the verifying time-out state in the case that the obtaining module determines that the user fingerprint information is not obtained by the obtaining unit within the preset duration.

Preferably, the IC card further includes a second setting module;

the first verifying module is specifically configured to verify the user fingerprint information obtained by the IC card according to the fingerprint information stored by itself; and the second setting module which is configured to set the user fingerprint information verified state as the verifying successfully state in the case that the user fingerprint information obtained by the IC card is verified successfully by the first verifying module; while set the user fingerprint information verified state as the verifying unsuccessfully state in the case that the user fingerprint information obtained by the IC card is verified unsuccessfully by the first verifying module.

Preferably, the IC card further includes the displaying module;

the displaying module is configured to control the indicator lamp of the IC card to display the first state information in the case that the fingerprint information verified state obtained by the first verifying module is the verifying successfully state; control the indicator lamp of the IC card to display the second state information in the case that the fingerprint information verified state obtained by the first verifying module is the verifying unsuccessfully state; and control the indicator lamp of the IC card to display the third state information in the case that the fingerprint information verified state obtained by the first verifying module is the verifying time-out state.

Preferably, the IC card further includes that a first generating module, a fourth sending module, a second generating module, a fifth sending module, a second verifying module, a sixth sending module, a second determining module, a third generating module and the seventh sending module;

the first generating module is configured to encrypt the random number included in an internal identifying command to generate a signature dynamic application data in the case that the first determining module 302 determines the received command is the internal identifying command;

the fourth sending module is configured to return an internal identifying command response that the first generating module generates the signature dynamic application data to the terminal, and to trigger the receiving module 301;

the second generating module is configured to executes a card action analysis to generate the first application cipher text in the case that the first determining module 302 determines that the received command is the generating the first application cipher text command;

the fifth sending module is configured to return the first application cipher text generated by the second generating module to the terminal, and to trigger the receiving module 301;

the second verifying module is configured to verify the third application cipher text in the external identifying command in the case that the first determining module 302 determines that the received command is the external identifying command;

the sixth sending module is configured to send the verifying successfully response to the terminal and trigger the receiving module 301 in the case that the third application cipher text is verified successfully by the second verifying module; while send the verifying unsuccessfully response to the terminal and trigger the receiving module 301 in the case that the third application cipher text is verified unsuccessfully by the second verifying module;

the second determining module is configured to determine a type of a verifying the third cipher text response included in the generating the second application cipher text command in the case that the first determining module 302 determines the received command is the generating the second application cipher text command;

the third generating module is configured to generate a transaction credential in the case that the second determining module determines that the verifying the third application cipher text response type is the verifying successfully response; to generate the application identifying cipher text in the case that the second determining module determines that the verifying the third application cipher text response type is verifying unsuccessfully response; and the seventh sending module is configured to send the transaction credential generated by the third generating module to the terminal, and to trigger the receiving module 301; is further configured to send the application identifying cipher text generated by the third generating module to the terminal, and trigger the receiving module 301.

The technical solution in the Embodiments of the present invention is further described more clearly and completely with the drawings of the present invention. Apparently, embodiments described herein are just a few embodiments of the present invention. On the basis of the embodiments, all other related embodiments which may be made by those skilled in the art without any inventive work belong to the scope of the invention.

The invention claimed is:

1. A working method for an IC card with fingerprint recognition function, wherein the method comprises the following steps:
    S1) waiting, by the IC card, for receiving a command from a terminal;
    S2) determining, by the IC card, a type of the command when the IC card receives the command, executing step S3 in the case that the received command is a selecting application command; executing step S4 in the case that the received command is an obtaining process option command; and executing step S5 in the case that the received command is a reading record command;
    S3) selecting, by the IC card, an application and returning a response to the terminal, then returning to step S1;
    S4) obtaining, by the IC card, a user fingerprint information verified state according to a content of the command, returning a processing option command response including an application file locators list which does not need to verify personal identification code to the terminal, then returning to step S1 in the case that the user fingerprint information verified state is a verifying successfully state; while returning a processing option command response including an application file locators list which needs to verify personal identification code to the terminal, then returning to step S1 in the case that the user fingerprint information verified state is a verifying unsuccessfully state; and
    S5) returning, by the IC card, a reading record response to the terminal according to the reading record command, in which the reading record response includes a method for verifying a card holder, and returning to step S1.

2. The method as claimed in claim 1, wherein step S2 further comprises that returning, by the IC card, a contactless applications list supported by the IC card to the terminal in the case that the received command is a selecting near payment system environment command, then returning to step S1.

3. The method as claimed in claim 2, wherein step S3 specifically is: selecting, by the IC card, an application from the contactless applications list and returning a response to the terminal, then returning to step S1.

4. The method as claimed in claim 1, wherein step S2 further comprises: returning, by the IC card, a contact applications list supported by the IC card to the terminal in the case that the received command is a selecting contact payment system environment command, then returning to step S1.

5. The method as claimed in claim 4, wherein step S3 specifically is: selecting, by the IC card, an application from the contact applications list and returning a response to the terminal, then returning to step S1.

6. The method as claimed in claim 1, wherein before step S4, the method further comprises: obtaining, by the IC card, user fingerprint information, verifying the user fingerprint information so as to obtain the fingerprint information verifying state.

7. The method as claimed in claim 6, wherein verifying the user fingerprint information so as to obtain the user fingerprint information verifying state specifically comprises: verifying, by the IC card, the user fingerprint information obtained by the IC card according to the fingerprint information stored by the IC card, setting the user fingerprint information verified state as the verifying successfully state in the case that the user fingerprint information obtained by the IC card is verified successfully; while setting the user fingerprint information verified state as the verifying unsuccessfully state in the case that the user fingerprint information obtained by the IC card is verified unsuccessfully.

8. The method as claimed in claim 1, wherein before returning to step S1, step S5 further includes: determining, by the terminal, whether a personal identification code needs to be input according to the method for verifying a card holder, if yes, receiving the personal identification code input by the user, then returning to step S1; otherwise, returning to step S1 directly.

9. The method as claimed in claim 1, wherein step S2 further comprises:
    executing step S6 when the received command is an internal identification command:

S6) encrypting, by the IC card, random number included in the internal identification command so as to generate signature dynamic application data, and returning an internal identification command response including the signature dynamic application data to the terminal, then returning to step S1;

executing step S7 in the case that the received command is a generating the first application cipher text command, S7) executing, by the IC card, a card action analysis so as to generate a first application cipher text, and returning the first application cipher text to the terminal, then returning to step S1;

executing step S8 in the case that the received command is an external identification command, S8) verifying, by the IC card, the third application cipher text in the external identification command, sending the verifying successfully response to the terminal and returning to step S1 in the case that the third application cipher text is verified successfully; while returning the verifying unsuccessfully response to the terminal and returning to step S1 in the case that the third application cipher text is verified unsuccessfully;

executing step S9 in the case that the received command is a generating the second application cipher text command, S9) determining, by the IC card, a type of verifying the third application cipher text response included in the generating the second application cipher text command, generating a transaction credential and sending the transaction credential to the terminal if the response is the verifying successfully response, and returning to step S1; while generating an application identification cipher text and sending the application identification cipher text to the terminal, and returning to step S1 if the response is the verifying unsuccessfully response.

10. The method as claimed in claim 9, wherein in the case that the response is the verifying successfully response, step S9 further comprises that sending, by the terminal, the received transaction credential to a server, then the transaction is ended; and in the case that the response is the verifying unsuccessfully response, step S9 further comprises that sending, by the terminal, the received application identification cipher text to the server, then the transaction is ended.

11. The method as claimed in claim 9, wherein step S6 further comprises: verifying, by the terminal, the signature dynamic application data in the internal identification command response.

12. The method as claimed in claim 1, wherein said method comprises:
   executing, by the terminal, a terminal risk management and a terminal action analysis.

13. An IC card with fingerprint recognition function, wherein said IC card comprises:
   a receiving module which is configured to receive a command from a terminal;
   a first determining module which is configured to determine a type of the command received by the receiving module;
   a first sending module which is configured to select an application and return a response to the terminal in the case that the first determining module determines that the received command is a selecting application command, and trigger the receiving module;
   an obtaining state module which is configured to obtain a user fingerprint information verified state according to a content of the command in the case that the first determining module determines that the received command is an obtaining process option command;
   a second sending module which is configured to return a processing option command response including an application file locators list which does not need to verify personal identification code to the terminal and trigger the receiving module in the case that the user fingerprint information verified state obtained by the obtaining state module is the verifying successfully state; while return a processing option command response including an application file locators list which needs to verify the personal identification code to the terminal and trigger the receiving module in the case that the user fingerprint information verified state obtained by the obtaining state module is the verifying unsuccessfully state; and
   a third sending module which is configured to return a reading record response to the terminal according to a reading record command in the case that the first determining module determines that the received command is the reading record command, in which the reading record response includes a method for verifying a card holder, and triggering the receiving module.

14. The IC card as claimed in claim 13, wherein said IC card further comprises a fourth sending module which is configured to return a contactless applications list supported by the IC card to the terminal and trigger the receiving module in the case that the first determining module determines that the received command is a selecting near payment environment command.

15. The IC card as claimed in claim 14, wherein the first sending module is specifically configured to select an application from the contactless applications list, return a response to the terminal, and trigger the receiving module in the case that the first determining module determines that the received command is the selecting application command.

16. The IC card as claimed in claim 13, wherein said IC card further comprises a fourth sending module which is configured to return a contact applications list supported by the IC card to the terminal and trigger the receiving module in the case that the first determining module determines that the received command is a selecting contact payment environment command.

17. The IC card as claimed in claim 16, wherein the first sending module is specifically configured to select an application from the contact applications list, return a response to the terminal, and trigger the receiving module in the case that the first determining module determines that the received command is the selecting application command.

18. The IC card as claimed in claim 13, wherein the obtaining state module further comprises a second setting unit;
   the verifying unit which is configured to verify user fingerprint information obtained by an obtaining unit according to fingerprint information stored by the IC card; and
   the second setting unit which is configured to set the user fingerprint information verified state as the verifying successfully state in the case that the verifying unit verifies the user fingerprint information obtained by the obtaining unit successfully; while set the user fingerprint information verified state as the verifying unsuccessfully state in the case that the user fingerprint information obtained by the obtaining unit is verified unsuccessfully.

19. The IC card as claimed in claim 13, wherein said IC card further comprises an obtaining module and a first verifying module;

the obtaining module is configured to obtain the user fingerprint information; and the first verifying module is configured to verify the user fingerprint information obtained by the obtaining module so as to obtain the fingerprint information verified state.

20. The IC card as claimed in claim 19, wherein said IC card further comprises the second setting module;

the first verifying module is specifically configured to verify the user fingerprint information obtained by the IC card according to the fingerprint information stored by the IC card; and the second setting module is configured to set the user fingerprint information verified state as the verifying successfully state in the case that the user fingerprint information obtained by the IC card is verified successfully; while set the user fingerprint information verified state as the verifying unsuccessfully state in the case that the user fingerprint information obtained by the IC card is verified unsuccessfully.

21. The IC card as claimed in claim 13, wherein said IC card further comprises a first generating module, a fourth sending module, a second generating module, a fifth module, a second verifying module, a sixth sending module, a second determining module, a third generating module and a seventh sending module;

the first generating module is configured to encrypt the random number included in the internal identification command so as to generate signature dynamic application data in the case that the first determining module determines that the received command is an internal identification command;

the fourth sending module is configured to return the internal identification command response including the signature dynamic application data generated by the first generating module to the terminal, and trigger the receiving module;

the second generating module is configured to execute a card action analysis so as to generate a first application cipher text in the case that the first determining module determines that the received command is a generating the first application cipher text command;

the fifth sending module is configured to return the first application cipher text generated by the second generating module to the terminal, and trigger the receiving module;

the second verifying module is configured to verify a third application cipher text in the external identification command in the case that the first determining module determines that the received command is the external identification command;

the sixth sending module is configured to send the verifying successfully response to the terminal and trigger the receiving module in the case that the second verifying module verifies that the third application cipher text is correct; while send the verifying unsuccessfully response to the terminal and trigger the receiving module in the case that the second verifying module verifies that the third application cipher text is not correct;

the second determining module is configured to determine a type of verifying the third application cipher text included in the generating the second application cipher text command in the case that the first determining module determines that the received command is the generating the second application cipher text command;

the third generating module is configured to generate a transaction credential in the case that the second determining module determines that the type of the third application cipher text response is the verifying successfully response; while generate application identification cipher text in the case that the second determining module determines that the type of the third application cipher text response is the verifying unsuccessfully response; and the seventh sending module is configured to send the transaction credential generated by the third generating module to the terminal and trigger the receiving module; and is further configured to send the application identification cipher text generated by the third generating module to the terminal, and trigger the receiving module.

* * * * *